United States Patent [19]
DeWid

[11] Patent Number: 4,995,192
[45] Date of Patent: Feb. 26, 1991

[54] SOIL COVER FOR POTTED OR IN-GROUND PLANTS

[76] Inventor: Richard DeWid, Raleigh, N.C.

[21] Appl. No.: 441,549

[22] Filed: Nov. 27, 1989

[51] Int. Cl.[5] .............................................. A01G 13/00
[52] U.S. Cl. .............................................. 47/30; 47/25
[58] Field of Search ...................................... 47/23-25, 47/30, 32, 84; 206/423

[56] References Cited

U.S. PATENT DOCUMENTS

| | | | |
|---|---|---|---|
| 1,712,093 | 5/1929 | Schirdler | 206/423 |
| 1,931,602 | 10/1933 | Colman | 47/25 |
| 3,314,194 | 4/1967 | Halleck | 206/423 |
| 3,571,972 | 3/1971 | Carter, Jr. | 47/32 |

FOREIGN PATENT DOCUMENTS

| | | | |
|---|---|---|---|
| 551758 | 12/1959 | France | 47/32 |
| 1381679 | 1/1975 | United Kingdom | 47/32 |

*Primary Examiner*—David A. Scherbel
*Assistant Examiner*—Michele A. Van Patten
*Attorney, Agent, or Firm*—Rhodes, Coats & Bennett

[57] ABSTRACT

A soil cover that when installed around the base of an existing plant or tree, forms a cone-like shape, truncated at the top to allow stem or trunk to pass through. Thus installed, the cover prevents over watering of the soil around the plant due to excessive rain and consequential loss of soil nutrients, loss of soil, root exposure. It gives the plant owner thee capability to control the moisture conditions of a plant's soil.

13 Claims, 1 Drawing Sheet

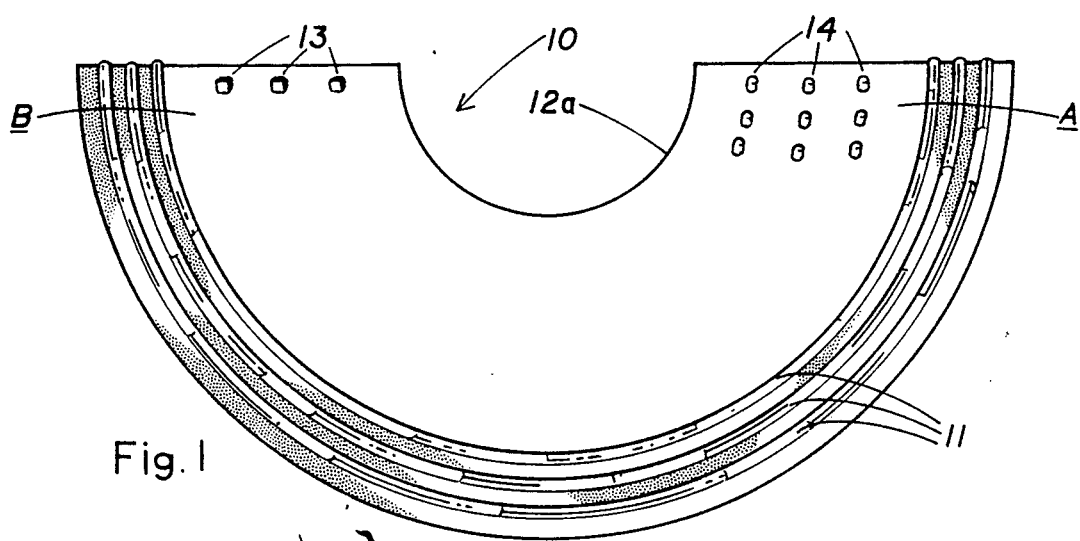
Fig. 1
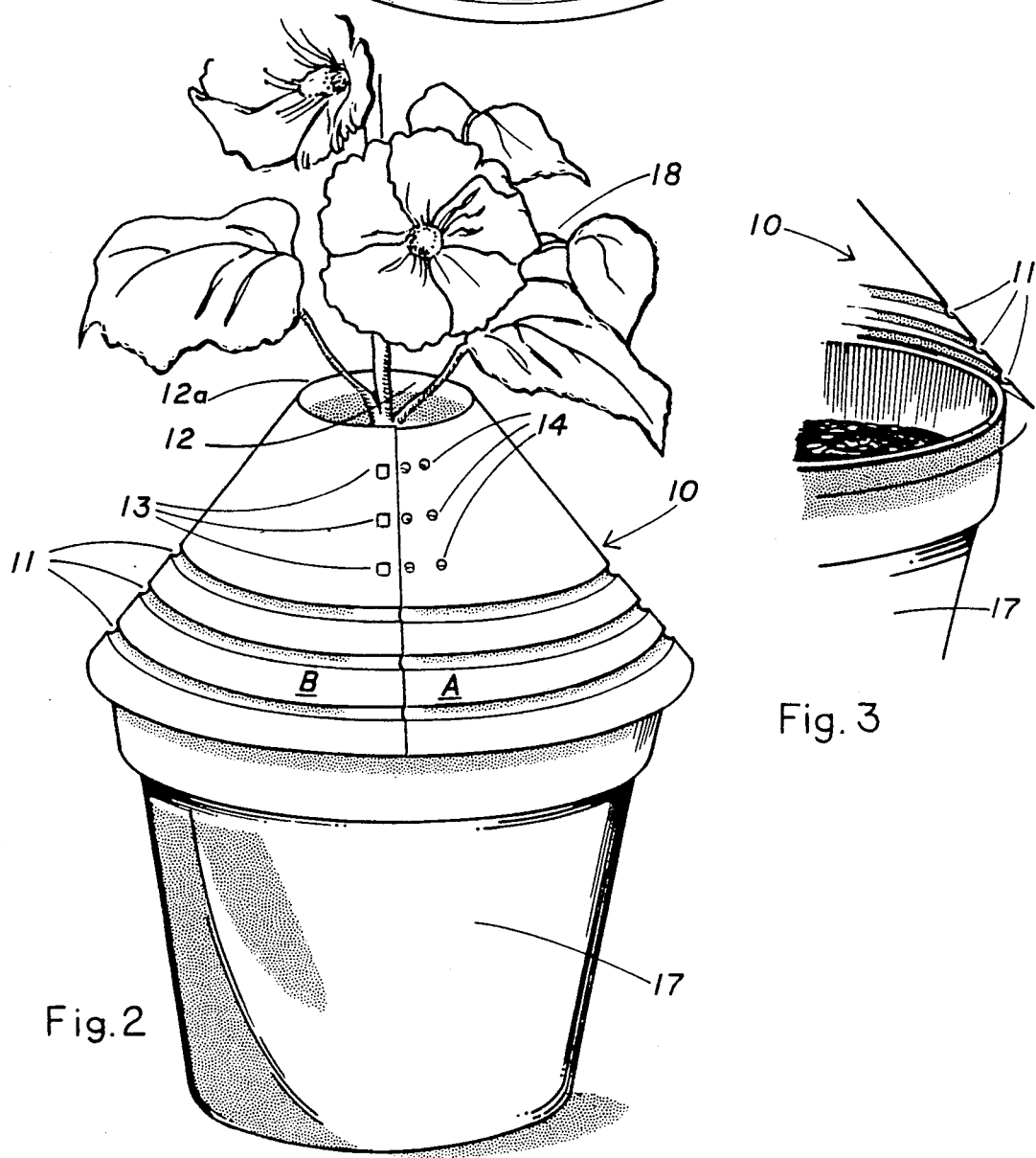
Fig. 2
Fig. 3

SOIL COVER FOR POTTED OR IN-GROUND PLANTS

BACKGROUND OF THE INVENTION

Outdoor plants in pots are easily overwhelmed with rain. Rain on unprotected potted plants leaches away soil nutrients and sometimes washes away the soil itself. It does not seem probable that an owner of outdoor plants would be able to protect plants very well because the owner is not present at all times to bring the plant under shelter. During periods of excessive rain, it is also not always possible or practical because of size, weight, or quantity, to take plants under shelter. Hence, there can be considerable reductions in plant healthiness, beauty, production, and plant death due to the lack of control. Plants that are in the ground may also benefit from this invention since it may also be otherwise impractical to give them shelter during periods of excessive rain. This invention relates to protecting plants by providing cover for the soil around the base of the plant. The cover provides several protective and controlling qualities that are aimed at making the plant healthy and productive.

Other protective covers have been suggested for potted plants. U.S. Pat. No. 4,395,845, granted to E. Markowitz, suggests a cover that aims at keeping the soil moist, and keeping the soil from spilling if the pot is tipped over. It is a disk-like cover that fits inside of the rim of the pot. This cover does not embody the capability to protect soil from excessive rain because is it flat and provides no run-off capacitiy. This cover also does not provide for controlled admittance of water.

U.S. Pat. No. 4,821,453 to J. Morehead suggests a cover that aims at protecting a plant in its early life. It is a truncated cone cover that allows filling cover with a fluid to provide thermal storage that would influence the growing environment. This cover does not embody the capability to protect large or mature plants because it does not accommodate installing on an existing plant which has larger foliage than its hole since it is one-piece construction. This cover also does not allow for controlled admittance of water.

Neither of the two referenced U.S. Patents have variances in construction, size, shape, or material to accommodate varying degrees of admittance of water, differing plant stem sizes and pot sizes, and differences in fitting for indoor or outdoor plants.

SUMMARY AND OBJECTS OF THE INVENTION

The present invention is directed to a protective cover for either potted or in-ground plants or trees, to control admittance of water into the soil around the plant.

A piece of flexible, water resistent, flat material, e.g. plastic, sheet metal, etc., cut into the approximate shape of a collar, is installed by wrapping it around the stem or stems of an existing plant, fastening the two ends, and allowing it to rest on, and overlap, the upper rim of the pot, or rest directly on the soil, depending on the intent for that particular cover. The installed shape of the cover forms a cone, with the small end truncated to form a top hole through with the plant stems pass.

Variations in the porosity and texture of the cover material characterize models of the cover having differing capacities to admit or restrict water to the plant soil, thereby allowing control for varying climatic conditions.

Variations in methods of fastening the two ends of soil cover allow the cover to have some amount of adjustability to stem and pot diameter and to fitting under foliage or branches.

Variations in the cut shape characterize models of the cover that have differing requirements for cone height and slope in its installed state, to fit under a plant's foliage or branches of varying heights.

Variations in construction characterize models of the cover that require having resistance to movement or dislodgement of the cover by forces such as weight of foliage, hard rain, or wind. An example of such a construction feature is several ribs, spaced several millimeters apart, running parallel to and starting near the bottom inside surface of the cover, that protrude inward to make contact with the rim of a plant pot. Multiple ribs allow adjustability to the pot size and, in pairs, the ribs provide resistance to upward, downward, and tipping movement thereby stabilizing the installed cover.

It is therefore an object of the present invention to provide a soil cover that is adjustable in size to accommodate different size and shape plants and to vary the degree of admittance of water to the plant.

Another object of the present invention resides in the provision of a soil cover that is designed to assume both a non-operative and an operative mode and wherein the soil cover can be easily transformed from the non-operative to the operative mode.

Still another object of the present invention resides in the provision of a soil cover design for protecting plants and controlling the amount of water directed to a plant which is particularly suitable for being produced in a disposable form.

A more specific object of the present invention resides in the provision of a soil cover design that in a non-operative mode is of a generally flat panel like shape and wherein the same can be transformed to an operative erect mode by selectively attaching opposite ends of the flexible panel to form an inverted conical shaped soil cover for extending around a plant.

Other objects and advantages of the present invention will become apparent and obvious from a study of the following description and the accompanying drawings which are merely illustrative of such invention.

BRIEF DESCRIPTION OF THE DRAWINGS

FIG. 1 is a plan top view of the cover laid flat, in an uninstalled state.

FIG. 2 is a perspective view of the cover installed around a plant stem and resting on the rim of a plant pot.

FIG. 3 is a partial sectional view illustrating stabilization ribs on the soil cover resting on the rim of the plant pot.

DETAILED DESCRIPTION OF THE INVENTION

FIG. 1 shows the underside of a soil cover 10, laid out horizontally, in an uninstalled state, the underside being the side which faces toward the plant stem, and the soil when formed into its installed cone-like shape. A cover can be produced from plastic, metal and other natural or synthetic materials having the basic characteristics of being water resistant, flexible, and inexpensive.

The materials used for a soil cover application that requires some admission of water will differ from the application that prevents admission of water. The surface of such a material can have characteristics such as gridwork, lattice, screening, porosity, punched or formed holes, or other such common means for allowing penetration of water through the cover.

The shape of the soil cover 10 may vary according to the combined requirements of plant shape, size, container size, cover material used, storage, packaging, shipping, and application intent such as allowing more admission of water may dictate less cover slope. A means of fastening the two ends A and B, is with the use of one or more nipples 13 at end B that would overlap with end A and each nipple snap into and be held in place by a hole 14 of a smaller diameter than the nipple, and that would form the resultant cone-like shaped soil cover. Using this, or other common means of fastening, it makes possible adjustment for an appropriate diameter at the base to fit the plant pot rim and at the top 12a of the formed cone to fit around the stem or stems.

FIG. 2 shows a perspective view of an installed soil cover 10, cone-like in shape, truncated at the point end to form a hole 12a through which a plant stem passes, the base of the cover resting on and overlapping the rim of a plant pot 17. The installed soil cover may also rest directly on the soil for some applications, such as for use with in-ground plants and trees.

To envision how the cover 10 in FIG. 2 is formed from the cover 10 shown in FIG. 1 the reader would imagine a plant 18 growing in pot 17 resting in the foreground, behind it a soil cover as shown in FIG. 1. The ends A and B of the cover in FIG. 1 are brought toward the reader and around the plant stem 12, fastened together, and allowed to rest on the rim of the plant pot 17. The fastening mechanism shown in FIG. 1, nipples 13 and holes 14, is unseen in FIG. 2 because cover end B is placed over end A and the nipples 13 project inward through underlying holes 14.

Fig. 3 shows a partial sectional view of soil cover 10 showing stabilization ribs 11 and their relationship to the plant pot 17 to stabilize the cover. The ribs may be needed under some application conditions such that size and proportions of a soil cover would make it unstable on a plant.

One means of stabilizing a soil cover that is installed on a plant pot rim, is with ribs 11 which protrude enough to make contact with the rim of the pot as illustrated in FIG. 3. Ideally, two of the ribs would make contact with the pot run so that there would be resistance to upward, downward, or tipping motion of the cover due to wind, heavy rain, heavy foliage resting on it, etc. The length of the ribs is such that when ends A and B are joined the ribs do not interfere with the flatness or fastening of the overlapped ends.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

I claim:

1. A soil cover for protecting soil surrounding a plant that extends upwardly from the soil wherein the soil cover is transformable from a sheet-like configuration to a self-supporting conical soil protector that extends around the plant and over underlying soil extending around the plant, comprising:

(a) a flexible collar having a main body portion, inside and outside curved edges, and a pair of end portions;

(b) attachment means formed on the collar for attaching the respective end portions together;

(c) the flexible collar being adapted to assume a sheet-like configuration but which is transformable into a conically shaped soil protector that wraps around the plant and extends over the underlying soil;

(d) wherein in the transformed soil protector configuration the collar forms an upright conically shaped soil protector having a relatively small upper opening for the plant to extend therethrough and a relatively large lower base opening disposed below the upper opening, wherein when the opposite end portions of the collar are attached the cut out forms the relatively small upper opening within the conically shaped soil cover that enables a plant to project therethrough; and (e) wherein the transformed soil protector mode the collar forms a surrounding side wall structure that surrounds the plant and from the upper opening extends downwardly and outwardly from the plant such that water falling on the side wall structure of the soil protector tends to run downwardly and outwardly along the side wall structure such that the soil protector is effective to cover a portion of the soil surrounding the plant and thereby covers a portion of the underlying soil so as to effectively control the amount of water reaching the soil surrounding the plant.

2. The soil cover of claim 1 wherein the inside and outside edges of the main body portion are generally arcuate shape.

3. The soil cover of claim 2 wherein the inside and outside edges of the main body of the flexible cover are generally concentric.

4. The soil cover of claim 1 including means formed on the collar and projecting therefrom for engaging a plant holding pot and supporting the soil cover about the pot when the soil cover assumes a transformed soil protector configuration.

5. The soil cover of claim 4 wherein the support means formed on the collar includes a plurality of spaced apart ribs.

6. The soil cover of claim 5 wherein each rib is generally elongated and extends in a generally curved fashion across the flexible collar.

7. The soil cover of claim 1 wherein said attachment includes first and second cooperating attachment devices that cooperate to connect end portions of the flexible collar.

8. The plant cover of claim 1 wherein the flexible collar in the non-operative state includes a cut-out formed generally between the opposite end portions of the collar, and wherein in the transformed operative mode the cut-out forms a generally central plant opening.

9. The soil cover of claim 1 wherein the collar includes means for permitting water to pass there through such that a portion of the water impinging on the cover, when the same assumes an operative slope, may permeate the cover and be directed to the underlying plant.

10. The soil cover of claim 1 wherein the cover is constructed of a porus material that enables water to pass there through for the benefit of the underlying covered plant.

11. A soil cover which can be transformed from a generally flat flexible panel to a generally erect and conically shaped soil cover that surrounds a plant and overlies an area of soil adjacent the plant so as to protect a select area of soil around the plant from falling water, comprising:
- (a) a collar panel that is generally flexible and includes a relatively thin generally curved main body having curved outside and inside edges, and opposite end portions;
- (b) the inside edge of the collar panel forming a cut out that lies generally between the two end portions of the collar when the collar assumes a generally flat posture;
- (c) attachment means formed on the collar for connecting the end portions of the collar together to transform the collar into a generally conically shaped soil cover having a side wall structure that is adapted to surround a plant and to overly an area of soil adjacent the plant;
- (d) the soil cover having a relatively small upper opening for the plant to extend therethrough and a relatively large lower base opening disposed below the upper opening such that when appropriately situated around the plant the upper smaller opening lies above the relatively large lower base opening such that the side wall structure formed by the conically shaped soil cover extends downwardly and outwardly from the plant such that falling water impinging on the wall structure of the plant cover is urged to move downwardly and outwardly from the plant so as to prevent portions of the down falling water from reaching portions of the soil underlying the soil cover; and
- (e) wherein when the opposite end portions of the collar are attached the cut out forms the relatively small upper opening within the conically shaped soil cover that enables a plant to project therethrough, wherein the small upper openings include a terminal edge spaced outwardly from the plant passing therethrough such that falling water may pass between the terminal edge and the plant.

12. The soil cover of claim 11 wherein said attach means comprises at least one connecting opening formed on one end of the collar, and at least one cooperating insert coupling formed on the other end of the collar that is adapted to be inserted into the coupling opening.

13. The soil cover of claim 12 wherein said attachment means includes a plurality of connecting openings formed on one end portion of the collar and a plurality of insertable nipples on the other end portion of the collar.

* * * * *